(12) United States Patent
Gurvich et al.

(10) Patent No.: US 12,161,952 B2
(45) Date of Patent: Dec. 10, 2024

(54) MEMBRANE BUNDLE FOR FUEL DEOXYGENATION WITH ENHANCED DURABILITY

(71) Applicant: Hamilton Sundstrand Corporation, Charlotte, NC (US)

(72) Inventors: Mark R. Gurvich, Middletown, CT (US); Richard E. Versailles, New Hartford, CT (US); Jay W. Kokas, Bloomfield, CT (US); Rebecca R. Stoner, North Granby, CT (US); Andrew M Caldecutt, Vernon, CT (US); Alan F. Hunter, West Springfield, MA (US); Haralambos Cordatos, Colchester, CT (US); Murtuza Lokhandwalla, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 64 days.

(21) Appl. No.: 17/896,405

(22) Filed: Aug. 26, 2022

(65) Prior Publication Data
US 2024/0066435 A1 Feb. 29, 2024

(51) Int. Cl.
*B01D 71/36* (2006.01)
*B01D 19/00* (2006.01)
(Continued)

(52) U.S. Cl.
CPC ....... *B01D 19/0031* (2013.01); *B01D 63/061* (2013.01); *B01D 63/069* (2022.08);
(Continued)

(58) Field of Classification Search
CPC .............. B01D 19/0031; B01D 63/069; B01D 71/5222; B01D 63/061; B01D 71/36;
(Continued)

(56) References Cited

U.S. PATENT DOCUMENTS 5,505,858 A * 4/1996 Monzen ............... B01D 63/023
   210/500.36
8,070,859 B2  12/2011 Ma et al.
(Continued)

FOREIGN PATENT DOCUMENTS

EP        1148931 B1    6/2006
JP     2020171923 A *  10/2020 ............. B01D 39/14

OTHER PUBLICATIONS

Partial European Search Report for EP Application No. 23190136.4 dated Feb. 2, 2024.
(Continued)

*Primary Examiner* — Robert A Hopkins
*Assistant Examiner* — Qianping He
(74) *Attorney, Agent, or Firm* — Carlson, Gaskey & Olds, P.C.

(57) ABSTRACT

A method of forming a degassing system includes the step of forming a bundle of hollow tube membrane members by wrapping hollow tube membrane members to form the bundle at a temperature above 100° F. (38° C.). Another method of forming a degassing system includes the step of the inserting bundle into an outer canister at a temperature above 100° F. (38° C.). A fuel supply system made by these methods is also disclosed.

14 Claims, 4 Drawing Sheets

(51) Int. Cl.
  *B01D 63/06* (2006.01)
  *B01D 71/52* (2006.01)
(52) U.S. Cl.
  CPC ......... *B01D 71/36* (2013.01); *B01D 71/5222* (2022.08); *B01D 2257/104* (2013.01); *B01D 2323/08* (2013.01); *F23K 2900/05082* (2013.01)
(58) Field of Classification Search
  CPC .......... B01D 2257/104; B01D 2323/08; F23K 2900/05082
  USPC ............................................................ 96/46
  See application file for complete search history.

(56) References Cited

U.S. PATENT DOCUMENTS

| | | |
|---|---|---|
| 9,623,369 B2 | 4/2017 | Bikson et al. |
| 10,576,397 B2 | 3/2020 | Cordatos |
| 2013/0287655 A1* | 10/2013 | Hamad ................ B01D 53/64 423/210 |
| 2018/0161732 A1 | 6/2018 | Coignet et al. |
| 2019/0054423 A1 | 2/2019 | Cordatos |
| 2019/0060787 A1* | 2/2019 | Cordatos .................. F02C 7/22 |

OTHER PUBLICATIONS

European Search Report for EP Application No. 23190136.4 dated Apr. 23, 2024.

* cited by examiner

MEMBRANE BUNDLE FOR FUEL DEOXYGENATION WITH ENHANCED DURABILITY

BACKGROUND

This application relates to a fiber membrane type fuel deoxygenation system wherein the fiber membrane system has enhanced durability.

Gas turbine engines are known and typically include a fuel supply for supplying fuel to a combustor. The fuel is mixed with air and ignited.

It is known that if oxygen is dissolved in the fuel when heated carbonaceous deposits will form. This is undesirable.

Thus, it is known to provide oxygen removal systems in a fuel supply system, such as for a gas turbine engine. While various types of oxygen removal systems are known, one that has proven successful is a bundle of hollow membrane tubes. The fuel is passed into the bundle and the oxygen passes through the tubes.

The dissolved gasses are then removed from the system, such as through a vacuum.

In practice, leakage of the fuel into the membranes has sometimes occurred. This is undesirable.

SUMMARY

A method of forming a system for degassing a fluid includes the steps of a) forming a bundle of hollow tube membrane members by wrapping hollow tube membrane members to form the bundle. The hollow membrane tube member is wrapped at an angle with respect to an axial direction of the bundle. In step b) the bundle is inserted into an outer canister. Step a) is performed in an enclosure maintained at a temperature above 100° F. (38° C.).

A method of forming a system for degassing a fluid includes the steps of a) forming a bundle of hollow tube membrane members by wrapping hollow tube membrane members to form the bundle. The hollow membrane tube member is wrapped at an angle with respect to an axial direction of the bundle. In step b) the bundle is inserted into an outer canister. Step b) is performed in an enclosure maintained at a temperature above 100° F. (38° C.).

A fuel supply system for a gas turbine engine includes a pump, an oxygen removal system and a combustor. The pump is configured to move fuel through the oxygen removal system to the combustor. The oxygen removal system has a bundle of hollow tube membrane members forming a bundle. The hollow tube membrane members are wrapped at an angle relative to each other, and received within an outer canister. A wrapping step for wrapping the hollow tube members occurs at a temperature equal to or above 100° F. (38° C.), and insertion of the bundle into the outer canister also occurs at a temperature above 100° F. (38° C.).

These and other features will be best understood from the following drawings and specification, the following is a brief description.

DETAILED DESCRIPTION

Figure 1:
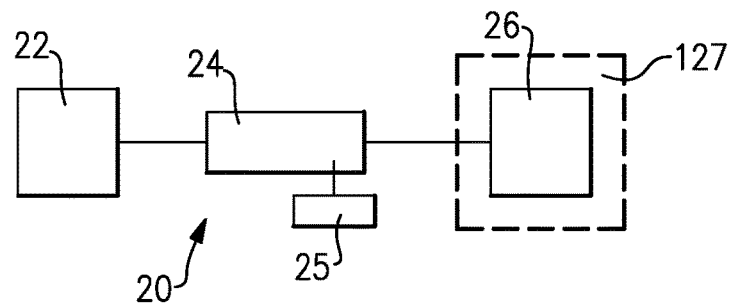
FIG. 1 schematically shows a fuel supply for a gas turbine engine.

FIG. 1 schematically shows a fuel supply system 20 for a gas turbine engine 27. A pump 22 delivers fuel through an oxygen removal system 24. A vacuum pump 25 is shown schematically removing the oxygen from the oxygen removal system 24.

The fuel is then delivered into a combustor 26 of a gas turbine engine 127, shown schematically.

Figure 2:
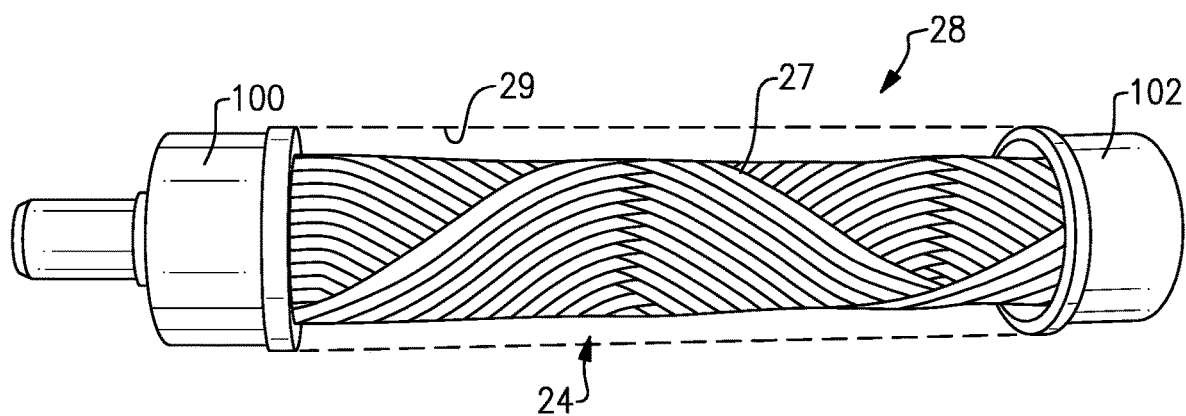
FIG. 2 shows a perspective view of a tube bundle which might be utilized in the FIG. 1 system.

One type of oxygen removal system 24 is illustrated in FIG. 2. As shown, there is a bundle 28 of wrapped hollow tube membrane members 27 inward of a canister 29. The hollow tube membrane members 27, and are formed of an appropriate plastic. In one example, the membranes may be formed of coated microporous polyetheretherketone ("PEEK"). A representative example of coating is Teflon amorphous fluoropolymer (AF).

Fuel is passed within the bundle 28, and oxygen or other gasses are removed from the fuel by passing through the wall over the tubes. It should be understood that coatings such as a Teflon AF is highly permeable to oxygen and, therefore, this coating is applied on an outer surface of the membranes.

As shown in FIG. 2, tube bundle 28 has a plurality of hollow (a bundle) tube membrane members 27 which are wrapped at an angle with respect to the axial orientation of the bundle. In other embodiments, tube membrane members 27 can be wrapped at different angles or/and have varied angle(s) along orientations of the bundle.

An axial direction is defined from an inlet end 100 to an outlet end 102.

Figure 3:
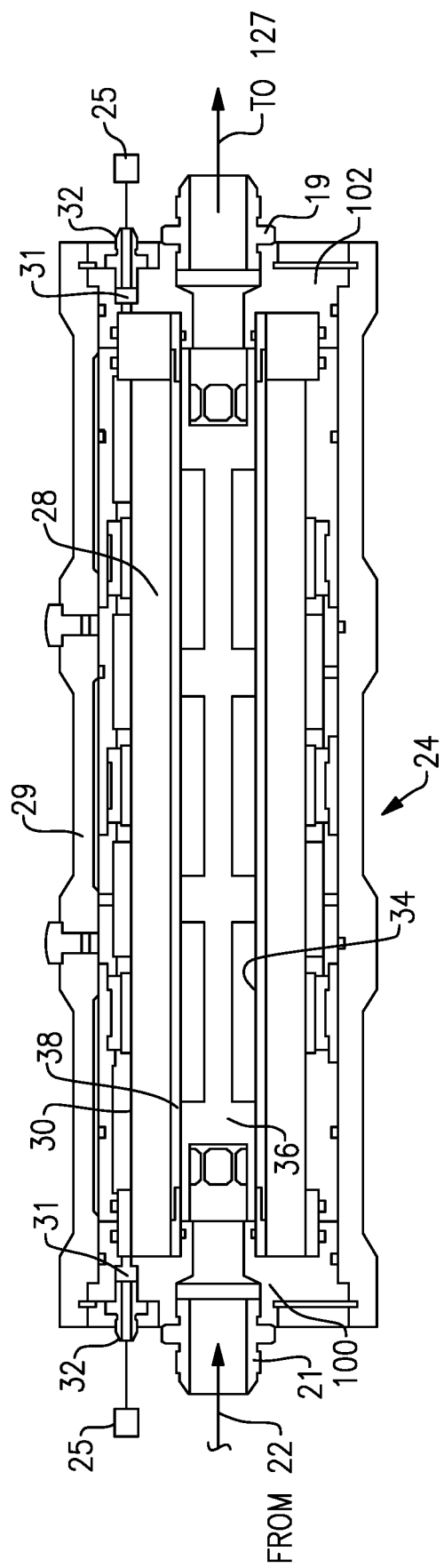
FIG. 3 shows a cross-sectional axial view of a gas removal system.

FIG. 3 shows an assembled oxygen removal system 24.

The tube bundle 28 is positioned around an interior baffle 36. The fuel passes into an inlet port 21 from the fuel pump 22, and the baffles 36 cause the fuel to move radially inwardly and outwardly, and encounter the tube bundle 28.

The fuel eventually reaches a location downstream of the baffle 36 and exits to the engine 127 through an outlet port 19. Oxygen passes into an outer periphery of the tube members in the bundle 28 into chambers 31 which is inwardly of the outer canister 29. Ports 32 may be connected to a vacuum pump 25 to remove the oxygen. There is an area 38 inward of the inner periphery 34 of the bundle 28 that allows the fuel to flow along the inner periphery 34 as guided by the baffles 36. The system as described above is generally as known.

As mentioned above, there has sometimes been challenges with fuel leaking into the bundle, which is undesirable. Applicant has recognized that some of the leakage occurs due to localized damage in the fiber bundle 28 at least partially due to thermal strains and stresses. Applicant has recognized that this local damage is due to both loads and thermal deformation and thermal stresses. Applicant has recognized that the thermal stresses are a result of differences in coefficients of thermal expansion between different components in the system 24, and also a temperature range between the temperature at which the bundle 28 and system 24 were formed and assembled, and the temperature that they might see in practice.

Essentially, Applicant has recognized that one reason for the leakage is initiation and growth of micro-damages during service conditions, and that the micro-damages are primarily influenced i) by stresses due to local load transfer and also ii) by thermal stresses due to differences in thermal expansion properties of key constituents of the fiber membrane system and temperature variation from conditions of fabrication to temperature actual service. Thus, the proposed solution is aimed to reduce the thermal stresses to improve durability of fuel deoxygenation systems, i.e., reduce risks of their fuel leakage.

Thermal strain is defined by a formula as follows:

$$\Delta\varepsilon=\Delta T*\alpha,$$

where $\Delta T$=temperature range between formation or assembly temperature and operating temperature, and $\alpha$=coefficient of thermal expansion (CTE).

The above formula of thermal strains in shown on example of constant CTE, i.e., independent of temperature. However, even in a case of thermal dependence of CTE, higher temperature range $\Delta T$ will still be associated with higher thermal strains $\Delta\varepsilon$. In other words, reduction of $\Delta T$ is an efficient way to reduce thermal strains and stresses. For simplicity, the description below is given for a case where CTE a is independent of temperature.

In the past, the tube bundle 28 has typically been wrapped at ambient temperatures. Moreover, the system 24 has generally been assembled at ambient temperatures. Of course, ambient temperatures are the easiest to utilize.

Figure 4:
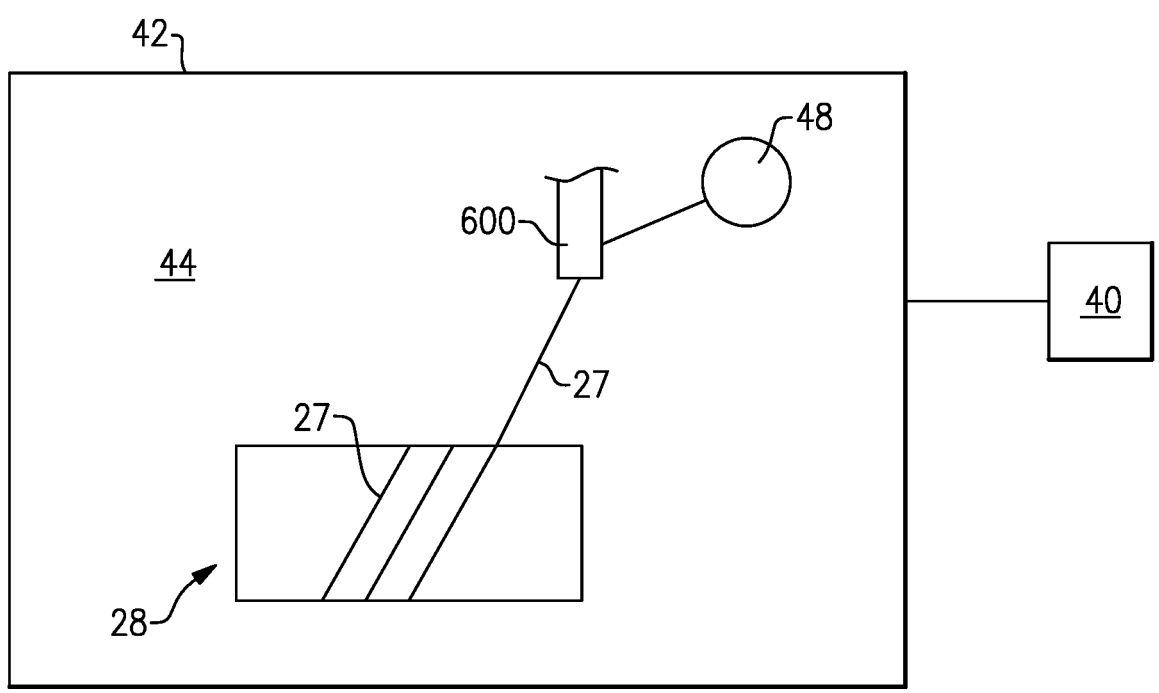
FIG. 4 schematically shows a first method step in assembling the FIG. 3 system.

However, as shown schematically in FIG. 4, the tubes 27 are being wrapped on the membrane bundle 28. A tool 600 is shown wrapping the tube 27 from a tube spool 48. The wrapping occurs on the interior baffle 36. In other embodiments, the bundle 28 can also be formed prior to inserting the interior components such as the baffle 36.

As is known, the membrane fibers 27 are wrapped at an angle relative to each other and around each other. The angle of each wrap need not be equal to angles of other wraps.

Any number of methods may be used for the wrapping step.

A control 40 controls a temperature with an interior 44 of an enclosure 42 in which the wrapping occurs. The interior 44 is maintained at an elevated temperature. This allows the $\Delta T$ component to be dramatically reduced. Since the wrap of the fibers 27 occurs at elevated temperature, the $\Delta T$ compared to the operating temperatures typically seen in a gas turbine engine will be significantly smaller.

It is typical that an oxygen removal system in an aircraft fuel supply may see temperatures in operation between 170° F. (77° C.) and 270° F. (132° C.). As mentioned above, in the past, the wrapping of the bundle 28 has typically occurred at ambient temperatures, or approximately 70° F. (21° C.). Thus, $\Delta T$ was routinely as high as 200° F. (93° C.).

However, in a disclosed method, the temperature within the chamber 44 is maintained above 100° F. In embodiments, it is also below 400° F. In further embodiments, it is above 120° F. and less than 300° F. In some embodiments, it is between 150° F. (66° C.) and 190° F. (88° C.). In alternative embodiments, it is between 200° F. (93° C.) and 240° F. (116° C.).

Gas turbine engines are being developed which will operate at increasing temperatures. Thus, the $\Delta T$ for the prior art oxygen removal systems wrapped at ambient temperatures will become even larger. The disclosed method dramatically reduces those differences, and will provide a more efficient operation.

Figure 5:
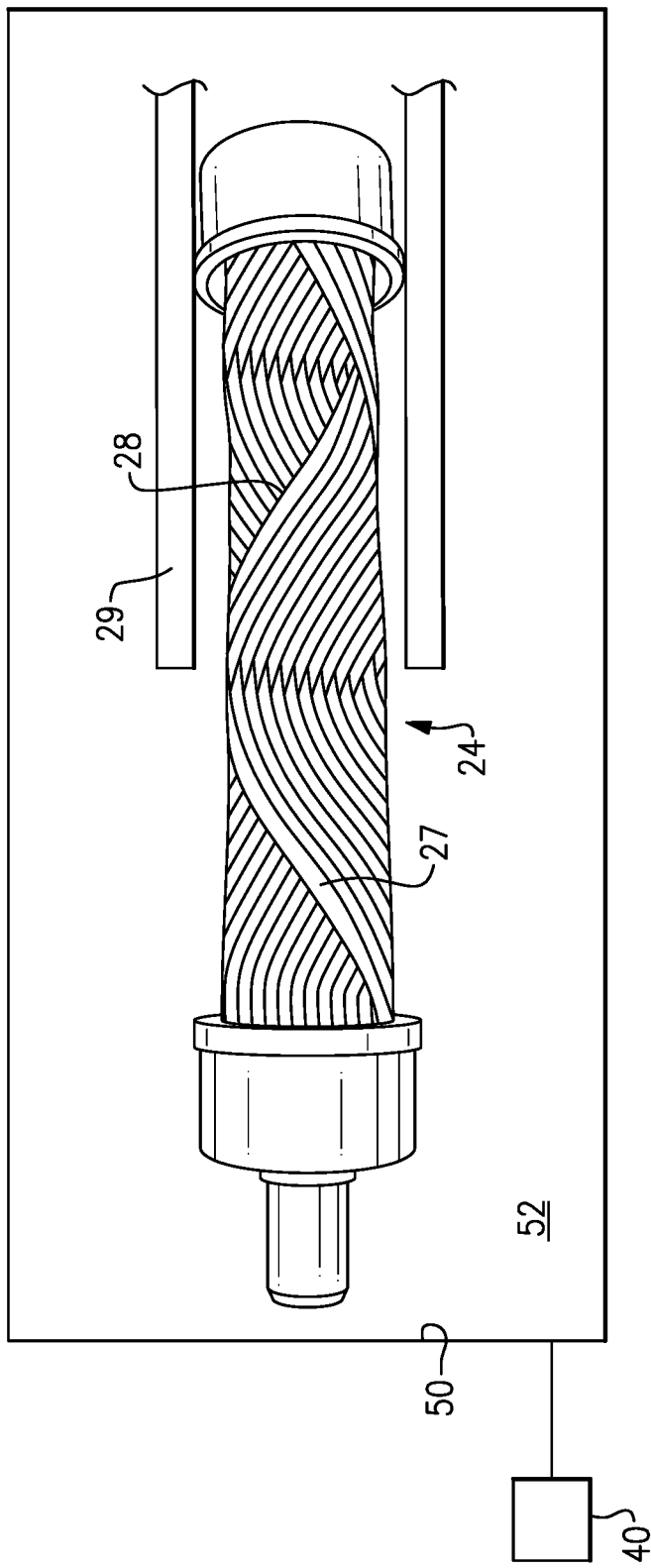
FIG. 5 shows a subsequent method step.

FIG. 5 shows a subsequent method step in the formation of the system 24. In FIG. 5, the bundle 28 has now been formed and is being assembled into the interior of the canister 29. It should be appreciated the canister 29 and components of the bundle 28 would be formed of different materials that might have different coefficient of thermal expansion. Here again, the $\Delta T$ component is very large in the prior art as the assembly has typically occurred at ambient temperature.

However, as shown schematically at FIG. 5, the bundle 28 is being assembled into the canister 29.

This assembly occurs within an enclosure 50 and in a space 52 within the enclosure 50. Here again, the control 40 controls the temperature within the chamber 52 during this assembly.

It is typical that an oxygen removal system in an aircraft fuel supply may see temperatures between 170° F. (77° C.) and 270° F. (132° C.). As mentioned above, in the past, the assembly has typically occurred at ambient temperatures, or approximately 70° F. (21° C.). Thus, $\Delta T$ was routinely as high as 200° F. (93° C.).

However, in a disclosed method, the temperature within the space 52 is maintained above 100° F. (38° C.). In embodiments, it is also below 400° F. (204° C.). In further embodiments, it is above 120° F. (49° C.) and less than 300° F. (149° C.). In some embodiments, it is between 150° F. (66° C.) and 190° F. (88° C.). In alternative embodiments, it is between 200° F. (93° C.) and 240° F. (116° C.).

A method of forming a system for degassing a fluid under this disclosure could be said to include the steps of a) forming a bundle of hollow tube membrane members by wrapping hollow membrane tubes to form the bundle. The hollow tube membrane members are wrapped at an angle with respect to an axial direction of the bundle. In step b) the bundle is inserted into an outer canister. Step a) is performed in an enclosure maintained at a temperature above 100° F. (38° C.).

A method of forming a system for a hydrocarbon fluid under this disclosure could also be said to include the steps of a) forming a bundle of hollow tube membrane members by wrapping hollow membrane tubes to form the bundle. The hollow membrane tubes are wrapped at an angle with respect to an axial direction of the bundle. In step b) the bundle is inserted into an outer canister. Step b) is performed in an enclosure maintained at a temperature above 100° F. (38° C.).

A fuel supply system for a gas turbine engine under this disclosure could be said to include a pump, an oxygen removal system and a combustor. The pump is configured to move fuel through the oxygen removal system to the combustor. The oxygen removal system has a bundle of hollow tube membrane members. The hollow tube membrane members are wrapped at an angle relative to each other with respect to an axial direction of the bundle, and received within an outer canister. A wrapping step for wrapping the hollow tube membrane members occurs at a temperature equal to or above 100° F. (38° C.), and insertion of the bundle into the outer canister also occur at a temperature above 100° F. (38° C.).

While the apparatus mentioned above differentiates from the prior art only by the method step, a worker of skill in this art would recognize that as disclosed above that method step does result in a distinct structure for the oxygen removal system as to the $\Delta T$ quantities.

Although embodiments have been disclosed, a worker of ordinary skill in this art would recognize that certain modifications would come within the scope of this disclosure. For that reason, the following claims should be studied to determine the true scope and content.

What is claimed is:

1. A method of forming a system for degassing a fluid comprising:
   a) forming a bundle of hollow tube membrane members by wrapping said hollow tube membrane members to form the bundle, said hollow tube membrane members being wrapped at an angle(s) with respect to an axial direction of the bundle;
   b) inserting said bundle into an outer canister; and
   said step a) is performed in a wrapping enclosure maintained at a temperature above 100° F. (38° C.).

2. The method as set forth in claim 1, wherein step b) is also performed within an insertion enclosure maintained above 100° F. (38° C.).

3. The method as set forth in claim 2, wherein the enclosure for step b) is maintained less than 400° F. (204° C.).

4. The method as set forth in claim 3, wherein the enclosure for step b) is maintained between 120° F. (49°° C.) and 300° F. (149° C.).

5. The method as set forth in claim 3, wherein the enclosure for step b) is maintained between 150° F. (66° C.) and 190° F. (88° C.).

6. The method as set forth in claim 3, wherein the enclosure for step b) is maintained between 200° F. (93° C.) and 240° F. (116° C.).

7. The method as set forth in claim 3, wherein the enclosure for step a) is maintained less than 400° F. (204° C.).

8. The method as set forth in claim 3, wherein the enclosure for step a) is maintained between 150° F. (66° C.) and 190° F. (88° C.).

9. The method as set forth in claim 3, wherein the enclosure for step a) is maintained between 200° F. (93° C.) and 240° F. (116° C.).

10. The method as set forth in claim 1, wherein the enclosure for step a) is maintained less than 400° F. (204° C.).

11. The method as set forth in claim 1, wherein the enclosure for step a) is maintained between 150° F. (66° C.) and 190° F. (88° C.).

12. The method as set forth in claim 1, wherein the enclosure for step a) is maintained between 200° F. (93° C.) and 240° F. (116° C.).

13. The method as set forth in claim 1, wherein said hollow tube members are formed of an appropriate plastic, wherein said appropriate plastic is Teflon AF-coated microporous polyetheretherketone.

14. The method as set forth in claim 1, wherein said system is inserted into a fuel supply system for a gas turbine engine.

* * * * *